United States Patent
Scheibel et al.

US007714124B2

(10) Patent No.: US 7,714,124 B2
(45) Date of Patent: *May 11, 2010

(54) METHODS FOR MODIFYING CELLULOSIC POLYMERS IN IONIC LIQUIDS

(75) Inventors: Jeffrey John Scheibel, Loveland, OH (US); Corey James Kenneally, Mason, OH (US); Julie Ann Menkhaus, Cleves, OH (US); Kenneth Richard Seddon, Donaghadee (IE); Prezemyslaw Chwala, Poznan (PL)

(73) Assignee: The Procter & Gamble Company, Cincinnati, OH (US)

( * ) Notice: Subject to any disclaimer, the term of this patent is extended or adjusted under 35 U.S.C. 154(b) by 190 days.

This patent is subject to a terminal disclaimer.

(21) Appl. No.: 11/726,609

(22) Filed: Mar. 22, 2007

(65) Prior Publication Data

US 2007/0225190 A1  Sep. 27, 2007

Related U.S. Application Data

(60) Provisional application No. 60/786,415, filed on Mar. 27, 2006.

(51) Int. Cl.
| | |
|---|---|
| C08B 3/00 | (2006.01) |
| C08B 5/00 | (2006.01) |
| C08B 7/00 | (2006.01) |
| C08B 13/00 | (2006.01) |
| C08B 37/00 | (2006.01) |
| C07H 1/00 | (2006.01) |
| C07H 3/00 | (2006.01) |

(52) U.S. Cl. .......................... 536/59; 536/124

(58) Field of Classification Search ................ None
See application file for complete search history.

(56) References Cited

U.S. PATENT DOCUMENTS

| 1,943,176 | A | | 1/1934 | Graenacher |
| 2,016,299 | A | | 10/1935 | Schulze |
| 3,903,261 | A | | 9/1975 | Miyoshi et al. |
| 5,378,828 | A | * | 1/1995 | Usher et al. .................. 536/59 |
| 6,101,818 | A | * | 8/2000 | Thomas et al. ................. 62/85 |
| 6,824,599 | B2 | | 11/2004 | Swatloski et al. |
| 6,852,229 | B2 | * | 2/2005 | Mehnert et al. ............. 210/634 |
| 2004/0077519 | A1 | | 4/2004 | Price et al. |
| 2004/0097755 | A1 | | 5/2004 | Abbott et al. |

FOREIGN PATENT DOCUMENTS

| EP | 0 063 399 A1 | 10/1982 |
| WO | WO 02/30878 A1 | 4/2002 |
| WO | WO 2005/017001 | 2/2005 |
| WO | WO 2005/017252 | 2/2005 |
| WO | WO 2005/023873 | 3/2005 |

OTHER PUBLICATIONS

Heinze, Thomas, et al., "Ionic Liquids as Reaction Medium in Cellulose Functionalization," Macromolecular Bioscience, Wiley-Vch Verlag, Weinheim, DE, vol. 5, 2005, pp. 520-525.

* cited by examiner

*Primary Examiner*—Shaojia Anna Jiang
*Assistant Examiner*—Layla Bland
(74) *Attorney, Agent, or Firm*—James F. McBride; Kim William Zerby; Steven W. Miller

(57) ABSTRACT

Sulfation or sulfonation of cellulose and cellulose ethers is conducted in an ionic liquid such as a quaternary ammonium salt. Detergent compositions containing the sulfated or sulfonated reaction product are suitable for fabric cleansing.

3 Claims, No Drawings

METHODS FOR MODIFYING CELLULOSIC POLYMERS IN IONIC LIQUIDS

CROSS-REFERENCE TO RELATED APPLICATION

This application claims benefit of U.S. Provisional Application Ser. No 60/786,415, filed Mar. 27, 2006.

FIELD OF THE INVENTION

The present invention relates to methods for modifying or derivatizing biopolymers in an ionic liquid medium to provide modified biopolymers, wherein the biopolymers include cellulose and cellulose ethers. The preferred method comprises at least partially dissolving a biopolymer in an ionic liquid and adding to the mixture a modifying agent having a functional moiety such that the resulting modified biopolymer contains the functional moiety. Specifically, the method involves modifying the biopolymer with sulfate or sulfonate moieties. The invention is further relates to surface care, fabric care and air care compositions containing such modified polymers.

BACKGROUND OF THE INVENTION

Various synthetic polymers are typically produced from petrochemical sources via well-known chemical processes. In recent years, the industry has renewed its focus on biopolymers from environmentally friendly, renewable sources of plants, animals and other living organisms. Extracting the biopolymers from their natural sources often employs large quantities of volatile organic solvents or other undesirable chemical solvents. It is a desirable next step to employ a "green solvent" to extract and process biopolymers.

In recent years, ionic liquids have been extensively evaluated as environmental-friendly or "green" alternatives to conventional organic solvents. Ionic liquids have been used to dissolve or treat cellulosic materials and starch. Such applications are described in U.S. Pat. Nos. 1,943,176; 6,824,599; WO 05/17001; WO 05/17252; and WO 05/23873.

Generally speaking, ionic liquids refer to a specific class of salts which are liquids at temperatures of 100° C. or below. Ionic liquids have very low vapor pressure and generate virtually no hazardous vapors. Moreover, ionic liquids are composed of charged species that provide a highly polar medium useful in various applications, such as extraction, separation, catalysis and as chemical synthesis media.

Additionally, ionic liquids have been shown to be effective in applications where water-based chemistry can be problematic (for example, applications involving proton transfer or nucleophilicity), or in applications where certain coordination chemistry could have a damaging effect on the substrates involved.

Therefore, it is desirable to take advantage of the highly polar and environmentally friendly nature of the ionic liquids in modifying and/or derivatizing biopolymers to provide modified biopolymers.

It is also desirable to provide modified biopolymers useful in various applications via green chemistry employing environmentally friendly starting materials and processes.

SUMMARY OF THE INVENTION

In broad terms, the invention is directed to methods for preparing a modified cellulose-based biopolymer in an ionic liquid. In one aspect, the method comprises reacting a sulfation or sulfonation agent, or mixture thereof, with a cellulose or cellulose ether biopolymer, or mixture thereof, in a reaction medium comprising an ionic liquid. A preferred, but non-limiting, embodiment comprises at least partially dissolving said cellulose or cellulose ether in an ionic liquid and adding a sulfation or sulfonation agent thereto, such that the cellulose or cellulose ether is converted to a derivative containing the sulfate or sulfonate functional moiety. The present invention thus provides methods for the sulfation or sulfonation of cellulosic biopolymers such as cellulose and cellulose ethers.

In further embodiments, the invention is directed to fabric care, surface care and air care compositions containing a sulfated or sulfonated cellulose-based polymer formed according to the methods disclosed herein.

Additional embodiments, objects and advantages will be more fully apparent in view of the following detailed description.

DETAILED DESCRIPTION OF THE INVENTION

The present invention provides a process for modifying and/or derivatizing biopolymers in an ionic liquid medium with sulfate and sulfonate functional groups, and mixtures thereof.

Suitable biopolymers are at least partially soluble in an ionic liquid. The biopolymers may be obtained from polysaccharides and biopolymers harvested from bacteria, fungi or plants. Suitable biopolymers include, but are not limited to, cellulose, cellulose ethers, and the like.

The derivatized biopolymers may be used in various applications, including but not limited to, fabric care compositions, surface care compositions and air care compositions.

Ionic Liquids

The term "ionic liquid" as used herein refers to a salt that has a melting temperature of about 100° C. or less, alternatively of about 60° C. or less, or in a further alternative, of about 40° C. or less. Some ionic liquids exhibit no discernible melting point (based on DSC analysis) but are "flowable" at a temperature of about 100° C. or below; other ionic liquids are "flowable" at a temperature of from about 20 to about 80° C. As used herein, the term "flowable" means that the ionic liquid exhibits a viscosity of less than about 10,000 mPa·s at temperatures of about 100° C. or below or from about 20 to about 80° C. Thus, the "fluid state" of an ionic liquid is meant to encompass all of these embodiments, including the molten state and the flowable state.

It should be understood that the terms "ionic liquid", "ionic compound", and "IL" refer to ionic liquids, ionic liquid composites, and mixtures (or cocktails) of ionic liquids. The ionic liquid can comprise an anionic IL component and a cationic IL component. When the ionic liquid is in its liquid form, these components may freely associate with one another (i.e., in a scramble). As used herein, the term "cocktail of ionic liquids" refers to a mixture of two or more, preferably at least three, different and charged IL components, wherein at least one IL component is cationic and at least one IL component is anionic. Thus, the pairing of these three cationic and anionic IL components in a cocktail would result in at least two different ionic liquids. The cocktails of ionic liquids may be prepared either by mixing individual ionic liquids having different IL components, or by preparing them via combinatorial chemistry. Such combinations and their preparation are discussed in further detail in US 2004/0077519A1 and US 2004/0097755A1. As used herein, the term "ionic liquid composite" refers to a mixture of a salt (which can be solid at room temperature) with a proton donor Z (which can be a liquid or a solid) as described in the patent documents immediately above. Upon mixing, these components turn into an ionic liquid that melts or flows at about 100° C. or less, and the mixture behaves like an ionic liquid.

The ionic liquid useful in the present invention comprises a cationic component (i.e., components having a nitrogen or phosphorus heteroatom with substituents such that the heteroatom is a "cationic center") selected from the group consisting of components having the following formulae:

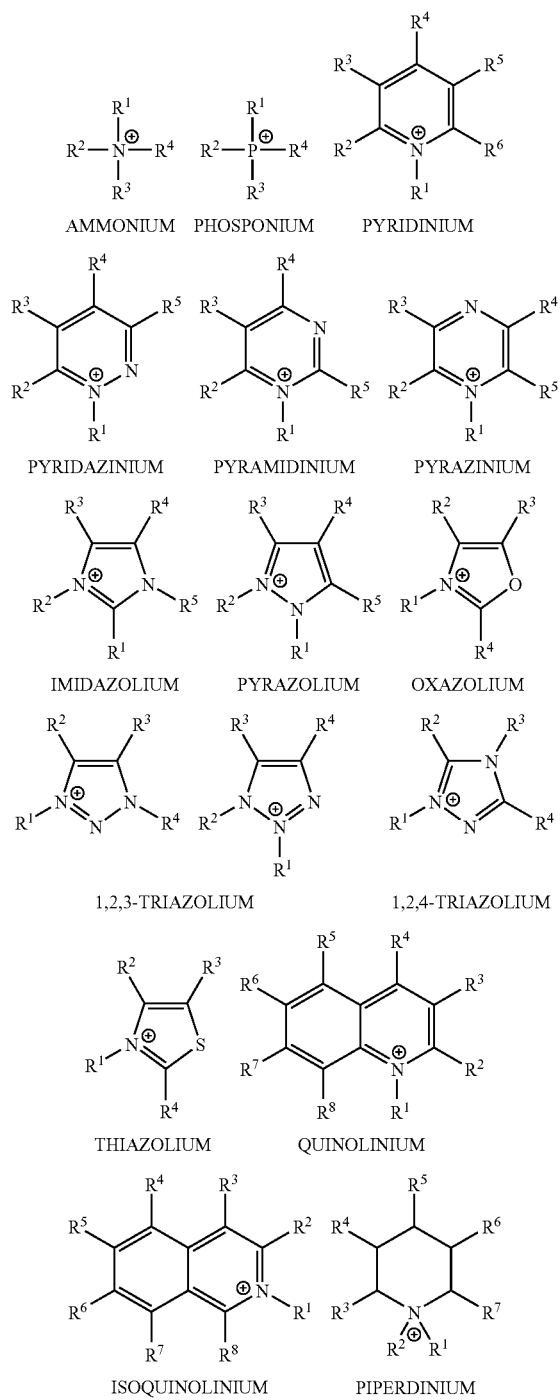

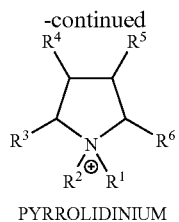

PYRROLIDINIUM wherein the $R^1$-$R^8$ substituents are independently selected from the group consisting of H, C1-C6 alkyl, alkenyl, hydroxyalkyl, haloalkyl, alkoxylalkyl; C6-C10 aryl or C8-C16 alkylenearyl; and mixtures thereof, with the proviso that the cationic center heteroatom substituents not be H, i.e., the cationic center is a "hard quat."

The ionic liquid useful in the present invention further comprises an anionic component ("X"), which, when paired with the cationic component, forms the ionic liquid. The anionic component is selected from the group consisting of halogens, especially chloride or bromide, C1-C6 carboxylates, C1-C6 alkyl sulfates, mono- or di-C1-C10 alkyl sulfosuccinates, mono- or di-C1-C10 ester sulfosuccinates, and mixtures thereof.

In some embodiments, the ionic liquid has the formula:

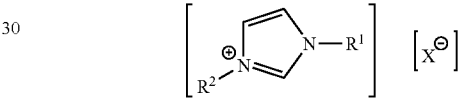

wherein $R^1$-$R^2$ are each independently selected from the group consisting of C1-C6 alkyl, alkenyl, hydroxyalkyl, haloalkyl, alkoxylalkyl; C6-C10 aryl or C8-C16 alkylenearyl; preferably a C1-C6 alkyl moiety or a C1-C6 alkoxyalkyl moiety or wherein $R^1$ can also be H; and the anionic component X is as noted above. In a specific embodiment, the ionic liquid has the formula immediately above, wherein $R^1$ is a C1-C6 alkyl moiety or C1-C6 alkoxyalkyl moiety, $R^2$ is methyl and the anion is chloride.

In other embodiments, the ionic liquid has the formula:

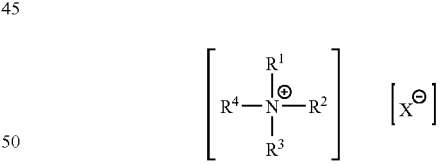

wherein $R^1$-$R^4$ are each independently C1-C6 alkyl, alkenyl, hydroxyalkyl, haloalkyl, alkoxylalkyl; C6-C10 aryl or C8-C16 alkylenearyl; and the anionic component X is as noted above. In still other embodiments, the ionic liquid has a dioctyl sulfosuccinate anion and a cationic component as shown immediately above.

Other examples of ionic liquids that are useful in the present invention are described in U.S. Pat. Nos. 6,048,388; 5,827,602; US 2003/915735A1; US 2004/0007693A1; US 2004/003120; US 2004/0035293A1; WO 02/26701; WO 03/074494; WO 03/022812; and WO 04/016570.

Typically, ionic liquids have high viscosities (greater than about 1000 mPa·s) at room temperature. In some embodiments of the present invention, the ionic liquids or cocktails of ionic liquids, which are undiluted with adjuncts, co-solvents or free water, have viscosities of less than about 750 mPa·s, preferably less than about 500 mPa·s, as measured at 20° C. In other embodiments, the viscosity of undiluted ionic liquids or cocktails are in the range from about 0.1 to about 400 mPa·s, preferably from about 0.5 to about 300 mPa·s, and more preferably from about 1 to about 250 mPa·s.

The viscosities of the ionic liquids can be measured on a Brookfield viscometer model number LVDVII+ at 20° C., with spindle no. S31 at the appropriate speed to measure materials of different viscosities. Typically, the measurement is done at a speed of 12 rpm to measure products of viscosity greater than about 1000 mPa·s; 30 rpm to measure products with viscosities between about 500 mPa·s to about 1000 mPa·s; and 60 rpm to measure products with viscosities less than about 500 mPa·s. The undiluted state is prepared by storing the ionic liquids or cocktails in a desiccator containing a desiccant (e.g. calcium chloride) at room temperature for at least about 48 hours prior to the viscosity measurement. This equilibration period unifies the amount of innate water in the undiluted samples.

Biopolymer Starting Materials

Biopolymers suitable for the sulfation or sulfonation process of the process include, but are not limited to, cellulose, modified cellulose, such as cellulose ethers described below and the like.

In one embodiment, the biopolymer suitable for use as the starting biopolymer is a nonionic cellulose ether having the general formula (I):

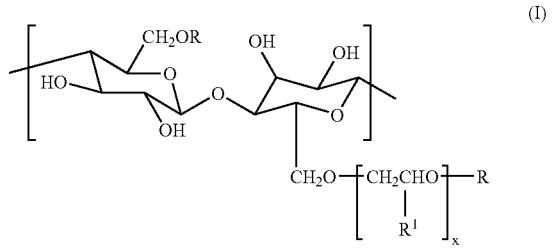

wherein each R is independently H or $C_8$-$C_{24}$ alkyl, preferably $C_8$-$C_{16}$ alkyl; $R^1$ is H or methyl, and x ranges from about 1 to 20, preferably from about 1 to 10. Alkyl substitution on the anhydroglucose rings of the polymer ranges from about 0.1% to 5% by weight, more preferably from about 0.2% to 2% by weight, of the polymer material.

In another embodiment, the biopolymer suitable for use as the reactant biopolymer is a nonionic cellulose ether having anhydroglucose ring alkyl substitution ranging from about 0.1 to about 5% by weight of the cellulose ether. The anhydroglucose ring substituents may be alkoxylated in amounts ranging from about 1 to about 20 moles. These nonionic cellulose ether polymers are sometimes called "hydrophobically modified" nonionic cellulose ethers because of the presence of long, fatty alkyl or alkoxyl chains in the molecule.

It is desirable, but not essential, that the nonionic cellulose ethers of the present invention have a weight average molecular weight of at least about 1,000, preferably in the range of from about 5,000 to about 10,000,000, more preferably from about 10,000 to about 2,000,000, most preferably from about 12,000 to about 1,000,000.

In another embodiment, the biopolymer suitable for use as the starting biopolymer can be a cationic cellulose ether having the general formula (II):

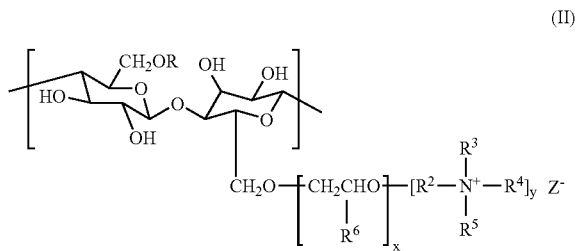

wherein R is H or $C_8$-$C_{24}$ alkyl, preferably $C_8$-$C_{16}$ alkyl; $R^2$ is $CH_2CHOHCH_2$ or $C_8$-$C_{24}$ alkyl, preferably $C_8$-$C_{16}$ alkyl; $R^3$, $R^4$ and $R^5$ are each independently methyl, ethyl or phenyl; $R^6$ is H or methyl; x ranges from about 1 to about 20, preferably from about 1 to about 10; and y ranges from about 0.005 to about 0.5, preferably from about 0.005 to about 0.1; and Z is a halide, such as $Cl^-$ or $Br^-$. Alkyl substitution on the anhydroglucose rings of the polymer ranges from about 0.1% to about 5% by weight, more preferably from about 0.2% to about 2% by weight, of the polymeric material.

In another embodiment, the cationic cellulose ether polymers may have anhydroglucose ring alkyl substitution ranging from about 0.1 to about 5% by weight of the cellulose ether. Moreover, in some instances, the anhydroglucose ring substitutions may contain from about 1 to about 20 moles of alkoxylated and from about 0.005 to about 0.5 moles of quaternary ammonium cationic moieties.

It is desirable, but not essential, that the cationic cellulose ethers used in the present invention have a weight average molecular weight of at least about 1,000, preferably in the range of from about 5,000 to about 10,000,000, more preferably from about 10,000 to about 2,000,000, most preferably from about 12,000 to about 1,000,000.

A commonly-used cationic polymer for fabric care compositions is the polymeric quaternary ammonium salt of hydroxyethyl cellulose, which can be prepared by reacting the hydroxyethylcellulose with a trimethyl ammonium substituted epoxide. This cationic cellulose ether is commonly referred to as Polyquaternium-10, or Polyquat-10, in the International Cosmetic Ingredient Dictionary published by the Cosmetic, Toiletry, and Fragrance Association (CTFA).

In yet another embodiment, the biopolymer suitable for use as the starting biopolymer is an anionic cellulose ether having the general formula (III):

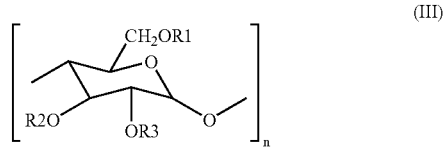

wherein n is 10 to 10000, preferably 50 to 5000, more preferably 100 to 3000; at least one of $R^1$, $R^2$ and $R^3$ is substituted with an anionically modified group selected from the group consisting of carboxyl, sulphonyl, or phosphonyl group; the remaining $R^1$, $R^2$ and $R^3$ are substituted with a moiety selected from the group consisting of carboxyl, sulphonyl, phosphonyl, acetyl, ether, ester, hydrogen, alkyl, hydroxyl or amido functional groups. The degrees of substitution (DS) of the anionically modified group is preferably from about 0.2 to about 1.2, more preferably, from about 0.3 to about 0.7.

In a specific embodiment, the anionic cellulose ether has the general formula (IV):

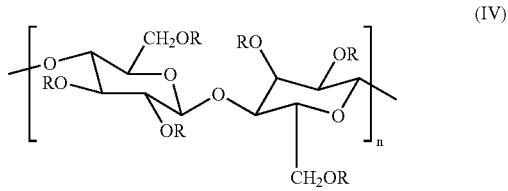

(IV)

wherein n is 10 to 10000, preferably 50 to 5000, more preferably 100 to 3000; each R is independently H; $CH_2COOA$, with A being Na or K; or $C_2$-$C_{24}$ alkyl, preferably $C_2$-$C_{16}$ alkyl. Alkyl substitution on the anhydroglucose rings of the polymer ranges from about 0.1% to about 5% by weight, more preferably from about 0.2% to about 2% by weight, of the polymer material. The anionic cellulose ethers may also have a degree of carboxymethyl substitution which ranges from about 0.05 to about 2.5, more preferably from about 0.1 to about 1.0.

In another embodiment, the anionically substituted cellulose ether polymers may have anhydroglucose ring alkyl substitution ranging from about 0.1 to about 5% by weight of the cellulose ether. The anhydroglucose ring may also have a degree of caboxymethyl substitution of from about 0.05 to about 2.5.

It is to be understood that all of the foregoing illustrative types of cellulosics fall within the definition of cellulose or cellulose ethers herein, but are not intended to be limiting thereof.

Processes

The present invention encompasses a method for preparing modified biopolymers. In a convenient mode, method comprises the steps of at least partially dissolving a biopolymer in an ionic liquid in its fluid state and in the substantial absence of water; adding a sulfation or sulfonation agent to convert the biopolymer into a modified biopolymer; and optionally adding a recovery solvent to the mixture, then separating the modified biopolymer from the mixture.

Due to the strong solvating power of the ionic liquid, the biopolymers, which are insoluble or have limited solubility in organic solvents or water, can be at least partially dissolved (usually at least about 1%, by weight) under mild conditions. For example, partial dissolution may be achieved even when no heat is applied. The term "partial dissolution" as used herein means the biopolymer would at the very least undergo some molecular or macromolecular changes, for example, decreased crystallinity, lowered glass transition temperature, disentanglement or disintegration of the molecular bundles, and the like. For some embodiments of the present invention, ever partial dissolution is found to activate the biopolymers sufficiently to allow the chemical modification to take place.

The dissolution step can be carried out at temperatures from about room temperature (20° C.) to about 100° C. under atmospheric pressure. In some embodiments, the dissolution process is carried out at temperatures from about 40 to about 90° C. Moreover, acid or base additive is not required for the dissolution or partial dissolution step, but can be employed if desired. Optionally, higher temperatures (for example, up to about 130° C.) may be employed to increase the dissolution rate, thus, reduce the processing time. The dissolution step may take from about 1 minute to about 5 hours, depending on the temperature.

For purposes of illustration, but not limitation, the amount of ionic liquids to biopolymers may have a weight ratio of from about 1:2 to about 100:1, or preferably from about 5:1 to about 50:1, or preferably from about 20:1 to about 10:1.

Under optimal conditions, the dissolution step produces a clear, transparent, or translucent solution or suspension (hereinafter referred to collectively as "solution") comprising the ionic liquid and the biopolymer, wherein the biopolymer is at a state of at least partially dissolved to completely dissolved.

In one embodiment, the dissolution mixture comprises from about 1 to about 15% or from about 5 to about 9% by weight of the solution of a biopolymer and at least about 50% by weight of the solution of an ionic liquid. Preferably, the solutions are substantially anhydrous. The term "substantially anhydrous" as used herein means less than about 10 wt % of water is present, preferably less than about 5 wt % of water is present, and more preferably, less than 1 wt % of water is present.

The sulfating or sulfonating agent is added to the reaction mixture, typically with stirring over a time period of 1 minute to about 2 hours. After the addition step, the reaction mixture is allowed to react for about 1 minute to about 12 hours with stirring and gentle heating (up to a temperature of about 130° C.). Optionally, sonication, pressure and/or vacuum may be applied to facilitate the reaction. If the reaction is exothermic, cooling may optionally be employed to maintain the desired reaction temperature.

Suitable agents for sulfation or sulfonation include, but are not limited to, chlorosulfonic acid, [$SO_3$.pyridine] complex, sulfuric acid, sulfamic acid, $SO_3$, and the like. When a very reactive modifying agent such as chlorosulfonic acid is used, it is added to the reaction mixture slowly or dropwise, with stirring; since the reaction with the dissolved or partially dissolved biopolymer is almost instantaneous. The reaction is essentially complete when all the modifying agent is added. The amount of modifying agent is typically from about 1 to about 6 moles, or from about 2 to about 5 moles per mole of monomer unit of the biopolymer.

At the end of the reaction, the biopolymer is converted to a modified (sulfated, sulfonated, or mixed) biopolymer. A recovery solvent can then be added to the mixture to reduce the solvating power of the ionic liquid; thus, the modified biopolymer is rendered non-soluble the reaction mixture. Then, the modified biopolymer is recovered by known separation methods, such as sedimentation, crystallization, centrifugation, decantation, filtration and combinations thereof.

The degree of substitution (DS) in the resulting modified biopolymer typically ranges from about 1 to about 6 moles, preferably from about 2 to about 4 moles of sulfate or sulfonate (or both) substituents per mole of monomer unit of the biopolymer.

In one embodiment, an effective amount of recovery solvent is added to the reaction mixture such that the modified biopolymer precipitates from the mixture. The weight ratio of recovery solvent to ionic liquid ranges from about 100:1 to about 1:2, preferably from about 20:1 to about 1:1, more preferably from about 10:1 to about 2:1. Optionally, acid or base can be added to the mixture to facilitate the precipitation and recovery of the biopolymers.

Exemplary recovery solvents include water, C1-C6 alcohols, C2-C6 ethers and acetone. Using water as the recovery solvent is particularly advantages because no volatile organic solvent is involved and the entire process is conducted with environmentally friendly media.

In a further embodiment, the ionic liquid is recycled for re-use in the process or for other use(s). The recovery solvent can be separated from the ionic liquid by evaporation, distillation or drying over absorbents, the latter being quite useful when water is the recovery solvent. Suitable absorbents or absorbent materials include those materials capable of selectively ingesting (via absorption or adsorption) water without ingesting ionic liquid. Suitable absorbents include, but are not limited to, hydrogel forming absorbent polymers, absorbent gelling materials (AGMs), and mixtures thereof Exemplary absorbent materials are disclosed in U.S. Pat. Nos. 3,661,875; 4,076,663; 4,093,776; 4,666,983; 4,734,478; 4,555,344; 4,828,710; 5,601,542; 6,121,509; WO 99/34841; and EP 648,521 A2.

Compositions Containing Modified Biopolymers

The modified biopolymers prepared according to the invention may be used in various applications and environments. For example, the modified biopolymers may be in combination with other benefit agents or with functional components, such as detersive surfactants, enzymes, perfumes, bleaches, softeners and the like.

The modified biopolymers can be used in fabric care, surface care and air care compositions, typically at levels from about 0.01% to about 20%, or greater, by weight of the total compositions. These biopolymers may impart fabric appearance benefits to laundered fabrics, such as reduction of pills and fuzz, protection against color fading, improved abrasion resistance, and overall improved appearance. The modified biopolymers may also be used in fabric care and surface care composition to provide cleaning benefits.

The compositions containing the modified biopolymers according to the present invention may additionally include one or more conventional fabric, surface and/or air treating adjunct components, as desired. Suitable adjunct components include, but are not limited to, other surfactants and builders (such as silicas, zeolites, phosphates, polacrylates, poly(acrylic-maleic) copolymers), enzymes, enzyme stabilizers (such as propylene glycol, boric acid and/or borax), suds suppressors, soil suspending agents, soil release agents, other fabric treating benefit agents such as anti-abrasion agents, wrinkle resistant agents, stain resistant agents, and water resistant agents, flame retardants, antimicrobial agents, metal bleach catalysts, bleaching agents, softeners, anti-pilling agents, water repellant agents, ultraviolet protection agents, pH adjusting agents, chelating agents, smectic clays, solvents, hydrotropes and phase stabilizers, structuring agents, dye transfer inhibiting agents, sizings, perfumes, coloring agents and mixtures thereof. Additional examples of suitable adjuncts are disclosed in U.S. Pat. No. 5,545,350, Baker et al.; U.S. Pat. No. 6,090,767, Jackson et al.; U.S. Pat. No. 6,420,326, Maile et al.; U.S. Pat. No. 6,482,793, Gordon et al.; U.S. Pat. No. 6,491,840, Frankenbach et al.; U.S. Pat. No. 6,548,470, Buzzaccarini et al.; U.S. Pat. No. 6,608,021, Westfield et al.; U.S. Pat. No. 6,767,880, Foley et al.; and U.S. Pat. No. 6,803,355, Panandiker et al.

The various optional adjunct ingredients, if present in the compositions herein, should be utilized at concentrations conventionally employed to bring about their desired contribution to the composition. Frequently, the total amount of such optional ingredients can range from about 0.01% to about 99%, preferably from about 0.1% to about 10%, and more preferably, from about 0.1 to about 5% by weight of the composition.

In another aspect of the present invention, the modified biopolymer may provide softening benefits and/or may improve delivery of another component or benefit agent to fabric surfaces in a substantive manner, i.e., to improve the deposition of such benefit agents on a fabric surface. Alternatively, or in addition, the modified biopolymers may assist in deposition of benefit agents which are later released from a fabric surface in a controlled release or delayed release manner. Exemplary benefit agents which may be used in association with a modified biopolymer according to the invention include, but are not limited to, perfumes, dyes, dye fixative agents, sizings, skin conditioning actives, vitamins, enzymes, surfactants, antimicrobial agents, builders, chelants, bleaches, bleach catalysts, bleaching boosters, bleach activators, softeners, suds suppressants, free radical initiators, ultraviolet protection agents, wrinkle resistant agents, fire retardants, brighteners, and mixtures thereof.

Air care compositions typically contain at least one air care component, for example a perfume, antimicrobial agent, or the like, in combination with a modified biopolymer according to the invention.

The surface, fabric and/or air care compositions may be formulated in any suitable form, including liquid, aerosol, gel, paste, foam, or solid. When the composition is in the solid form, it can be further processed into granules, powders, tablets, or bars.

The composition may be employed as a component of another cleaning product, for example by application to an absorbent substrate to provide a wipe for use in various applications. Any suitable absorbent substrate may be employed, including woven or nonwoven fibrous webs and/or foam webs. It is preferred that such an absorbent substrate should have sufficient wet strength to hold an effective amount of the composition according to the present invention to facilitate cleaning.

The compositions may also be provided in a unit dose product, which comprises the composition and a unit dose package made of water soluble polymer film. Unit dose package such as those disclosed in U.S. Pat. Nos. 4,973,416; 6,451,750; 6,448,212; and 2003/0,054,966A1, are suitable for use with the composition of the present invention. The embodiments containing little or no water (e.g., the "supercompact" composition) may be advantageous for improving the stability of unit dose packaged materials and products.

The compositions may be provided in various forms, including, but not limited to, hand dishwashing detergents, automatic dishwashing detergents, fabric pretreating compositions, hand laundry detergents, automatic laundry detergents, and the like.

EXAMPLES

Example 1

Sulfation of Cellulose in Ionic Liquid

A mixture of 2.1 grams (about 0.0129 equivalents) of cellulose (Modo Pulp, avg. molecular weight about 250,000 Daltons), 36.4 grams of 1-n-butyl-3-methylimidazolium chloride and 0.5 ml of pyridine is added to a 250 ml round bottom flask and held in a vacuum oven at 100° C. overnight. The flask is then equipped with a mechanical stirrer and gas inlet tube and placed in a 75° C. oil bath under nitrogen. When the viscous mixture becomes stirrable, powders of sulfur trioxide-pyridine complex (Aldrich, 6.2 grams, 0.0389 mol) are added. The powders slowly dissolve into the mixture and the mixture is allowed to react at 75° C. with stirring for 4 hours. Then, the mixture is cooled to room temperature, precipitated with 50-70 ml of methanol and neutralized with sodium methoxide (Aldrich, 8.6 grams of 25% mixture in methanol, 0.0400 mol).

The crude product, a fine white to off-white precipitate, is isolated by suction filtration, washed with generous portions of methanol, and dried on a Kugelrohr apparatus (65° C. at about 1 mm Hg for one hour) to yield about 6.3 grams of the final product in the form of off-white powders. Carbon-13 NMR of the product shows the disappearance of starting cellulose C-6 peak at about 62 ppm and the emergence of a new peak at about 69 ppm consistent with sulfation.

In a preferred embodiment, the mole ratio of sulfate or sulfonate substituents saccharide units in the cellulose-based polymer is greater than about 0.1:1, and preferably lies in the range of greater than about 0.1:1 to about 1:1, most preferably about 0.5:1. With these ranges, the removal of particulate soils (as measured using clay and carbon black) from fabrics in an aqueous laundering process appears to be optimal.

Example 2

Laundry Detergents

Non-limiting examples of laundry detergent compositions formulated to provide improved removal of particulate soils from fabrics (clay/carbon black) are as follows:

| Ingredient | Range % (wt. of composition) |
| --- | --- |
| $C_{10–14}$ alkyl benzene sulfonate | 0%–25%* typically 1%–20% |
| $C_{10}$–$C_{20}$ alkyl ethoxy ($EO_{3–10}$) sulfate | 0%–25% typically 3%–20% |
| $C_{10}$–$C_{20}$ alkyl sulfate | 0%–25% typically 1%–20% |
| Ethoxylated $C_{10}$–$C_{18}$ alcohols | 0%–25% typically 3%–20% |
| Zeolite builder | 0%–40% typically 10%–25% |
| Sulfated cellulose** | 0.01%–20% preferred 0.1%–1% |
| Miscellaneous*** | to 100% |

*Total anionic surfactant is product should typically fall in the 5–25% range.
**According to the present invention; mole ratio of sulfate to saccharide unit approximately 0.5:1.
***Auxiliary builders, optical brighteners, bleach, processing aids, moisture, perfume.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for preparing a modified, cellulose-based biopolymer, comprising reacting $SO_3$, $SO_3$.pyridine complex, or mixture thereof, with a cellulose or cellulose ether biopolymer, or mixture thereof, in a reaction medium comprising a substantially anhydrous ionic liquid, adding a recovery solvent to said reaction medium to precipitate said modified biopolymer and recycling the ionic liquid for re-use by drying said solvent to said substantially anhydrous state with a material that selectively ingests water without ingesting ionic liquid; wherein the ionic liquid comprises a cationic component including a heteroatom having substituents such that the heteroatom is a cationic center, said cationic component being selected from the group consisting of components having the following formulae:

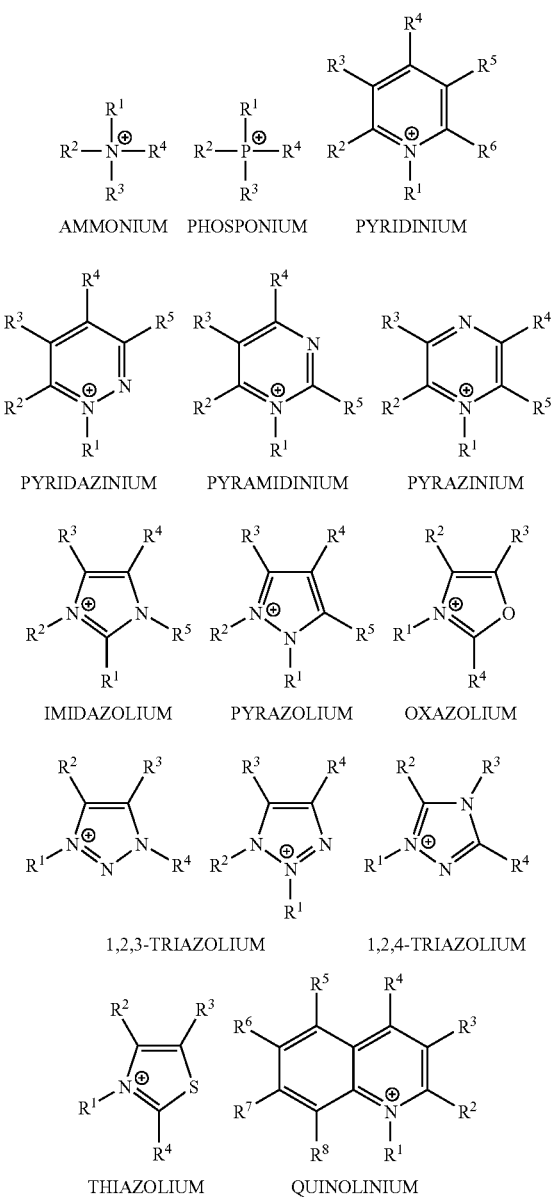

-continued

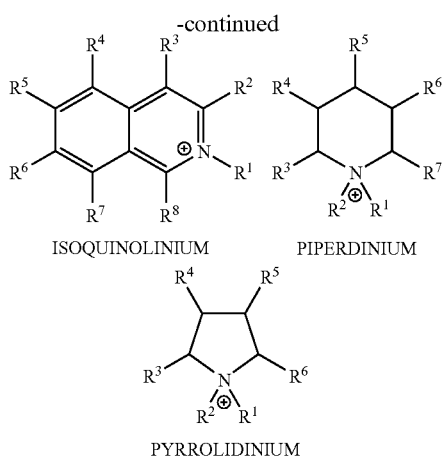

ISOQUINOLINIUM   PIPERDINIUM

PYRROLIDINIUM wherein the $R^1$-$R^8$ substituents are independently selected from the group consisting of H, C1-C6 alkyl, alkenyl, hydroxyalkyl, haloalkyl, alkoxylalkyl; C6-C10 aryl or C8-C16 alkylenearyl; and mixtures thereof, with the proviso that the substituents at the cationic center not be H; and
an anionic component selected from the group consisting of mono- or di-C1-C10 alkyl sulfosuccinates, mono- or di-C1-C10 ester sulfosuccinates, and mixtures thereof.

2. A method according to claim 1, comprising:
  (a) at least partially dissolving said biopolymer in an ionic liquid;
  (b) adding a sulfation or sulfonation agent to said biopolymer and converting the biopolymer into a sulfated or sulfonated biopolymer.

3. The method according to claim 1 wherein the cellulose ether is selected from the group consisting of a nonionic cellulose ether, a cationic cellulose ether, an anionic cellulose ether, and combinations thereof.

* * * * *